Sept. 21, 1948.                M. STRAUSS                2,449,825
                    THIRD DIMENSION ANIMATED DISPLAY
                      DEVICE INCLUDING MOVABLE FRAMES
Filed Nov. 30, 1945                                  2 Sheets-Sheet 1
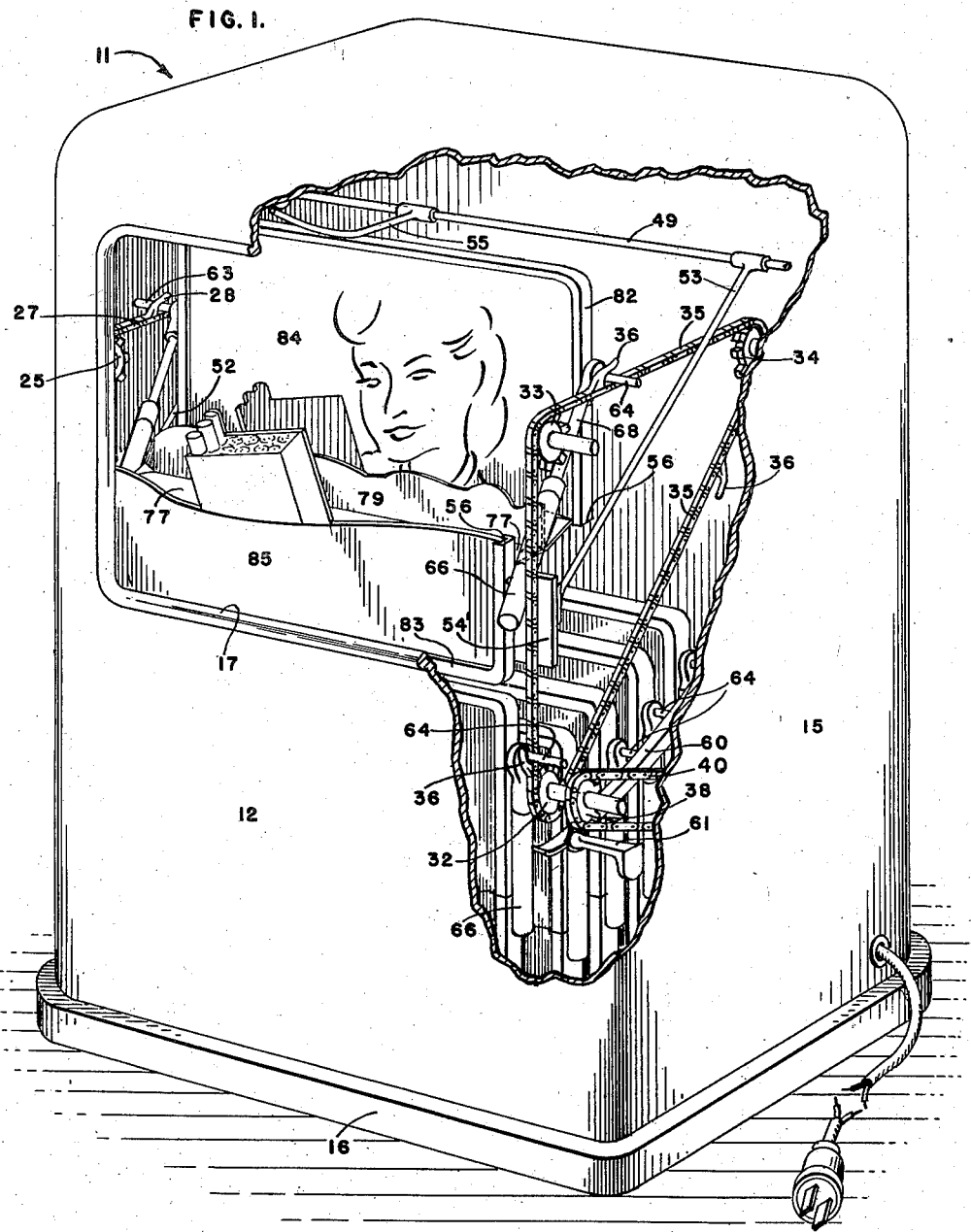
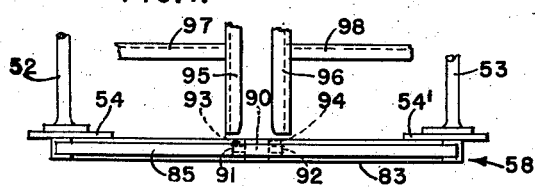
INVENTOR.
MORRIS STRAUSS,
BY
ATTORNEY Sept. 21, 1948.  M. STRAUSS  2,449,825
THIRD DIMENSION ANIMATED DISPLAY
DEVICE INCLUDING MOVABLE FRAMES
Filed Nov. 30, 1945  2 Sheets-Sheet 2
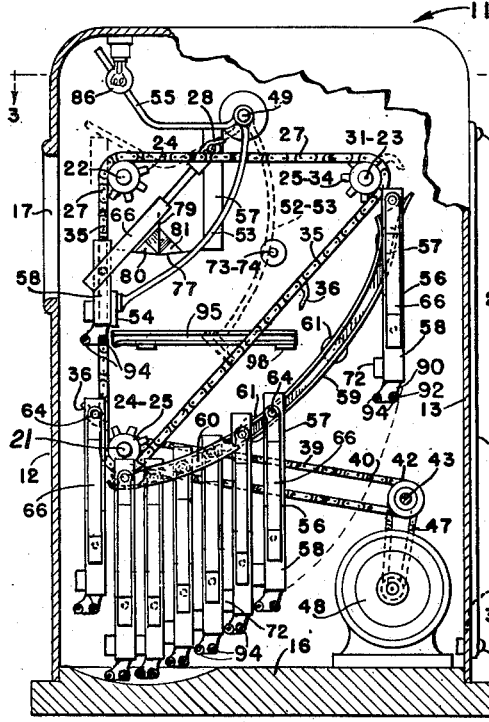
FIG. 2.
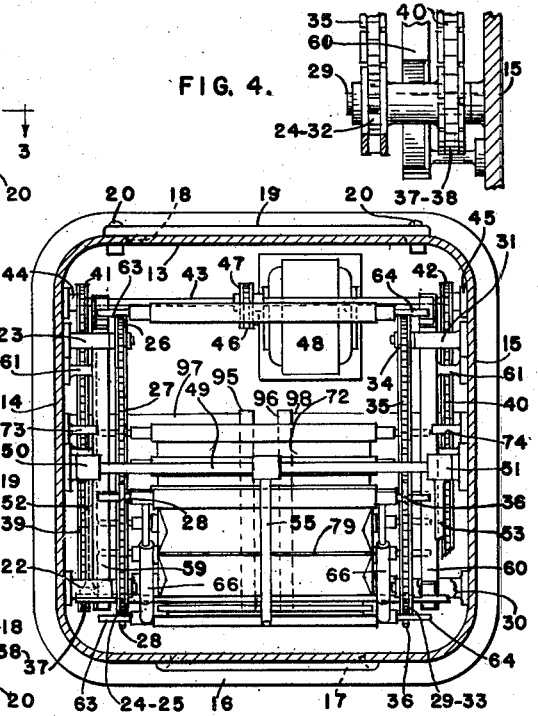
FIG. 3.
FIG. 4.
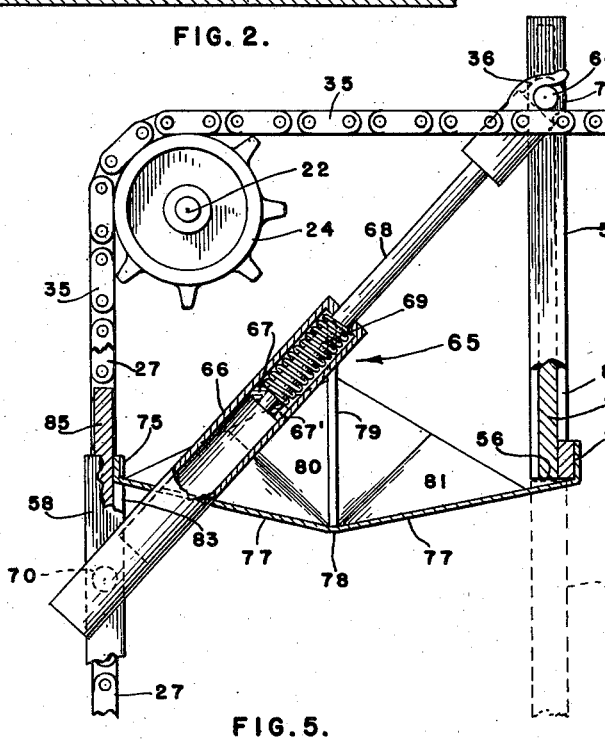
FIG. 5.
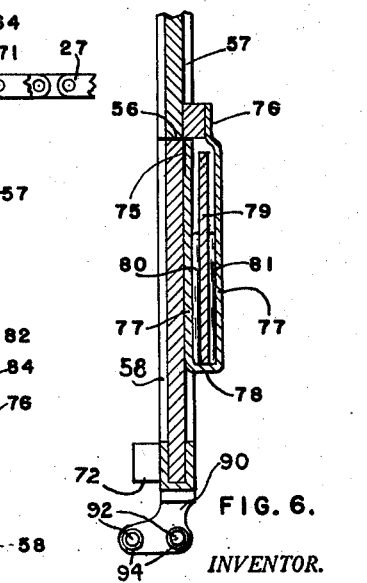
FIG. 6.
INVENTOR.
MORRIS STRAUSS,
BY *Irving Seidman*
ATTORNEY Patented Sept. 21, 1948

2,449,825

UNITED STATES PATENT OFFICE 2,449,825

THIRD DIMENSION ANIMATED DISPLAY DEVICE, INCLUDING MOVABLE FRAMES

Morris Strauss, Brooklyn, N. Y.

Application November 30, 1945, Serial No. 631,871

5 Claims. (Cl. 40—36)

1

This invention relates to improvements in display devices employed for advertising, displaying announcements, and for various other purposes.

My invention has particular reference to a device of said character wherein a series of display frames carrying announcement or display cards which are automatically moved within a housing or cabinet, and brought into line with an observation opening in said housing or cabinet, to successively expose said frames to view through said observation opening, and more particularly, my invention relates to a device of the character described wherein the said frames are split into sections which are adapted to move into two or more vertical planes.

An object of my invention is the means provided in a display device of the character described, for breaking up the picture presentation on the display cards and moving the separated sections apart, and holding them in vertical planes to present a "three dimensional" picture to the observer looking through the said observation opening.

Another object of my invention is the provision in same, of means for automatically moving the said frames, carrying pictorial views or other matter, continuously around a circuit and presenting the said views in consecutive order before the said observation opening in said housing.

A further object of my invention is the provision therein of a simple means for drawing apart the said sectional parts of the display frame and the means employed for restoring the separated parts to their normal position.

Another object of my invention is the means employed therein for carrying and animating an intermediate display card and the means for animating and moving same into and out of view.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The invention possesses other objects and features of advantage, some of which, with the foregoing will be set forth in the following description and in the claims wherein parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a perspective view of my device and shows the housing or cabinet partly broken away to disclose a portion of the operating mechanism.

Fig. 2 is a side elevation with the side of the casing broken away showing the mechanism within.

Fig. 3 is a sectional plan view taken along the line 3—3 of Fig. 2 and looking in the direction indicated by the arrows.

Fig. 4 is a detail view which will be hereinafter explained.

Fig. 5 is an enlarged view of a part of the mechanism which will be hereinafter explained.

Fig. 6 is an enlarged sectional view through a part of the display frame and will be hereinafter described, and Fig. 7 is a detail view of a part which will be hereinafter explained.

In the drawings where two reference numerals are shown and but one part is indicated, the designation indicates that a similar part is behind, in front or below the part shown and in line with it.

Referring in detail to the parts, 11 designates a housing or cabinet having a front, a rear and side walls, 12, 13, 14 and 15, respectively, and a base 16 to which the cabinet is attached. The front wall 12 is provided with a window or observation opening 17. The rear wall 13 may be provided with an access opening 18, and cover 19 which is attached to the cabinet by means of screws 20.

Shaft bearings 21, 22 and 23 are attached to the side wall 14 and provide bearings for the sprocket wheels 24, 25 and 26, respectively. The said sprocket wheels carry an endless chain 27 having, at determined intervals thereon, fingers or hooks 28 for the purpose hereinafter explained.

Similar shaft bearings 29, 30 and 31 are attached to the side wall 15 but extend in an opposite direction to provide bearings for the sprocket wheels 32, 33 and 34 to carry an endless chain 35 having at intervals thereon, fingers or hooks 36, for a purpose to be explained.

The lower sprocket wheels 24 on side wall 14 and 32 on side wall 15 are mounted in similar bearings and carry additional sprocket wheels 37 on one side and 38 on the opposite side, which latter sprockets engage the chain drives 39 and 40 in turn engaging the sprockets 41 and 42 upon a shaft 43. One end of the said shaft 43 is mounted in a bearing 44 on side wall 14 while the opposite end of the shaft 43 is mounted in a bearing 45 upon the side wall 15. A sprocket wheel 46 mounted upon the shaft 43 is driven by means of chain 47 connecting same with a motor 48.

Extending across the cabinet near the top of same is a shaft 49 mounted in bearings 50 and 51. Extending downwardly and forwardly from the said shaft 49 are the arms 52 and 53 and to the lower end of the arm 52 there is attached a stop or holding plate 54 while to the lower end of the arm 53 there is attached a stop or holding plate 54 whose function will be hereinafter explained. Extending from and attached to the said shaft 49 is an arm 55 integral with the said shaft 49 and arms 52 and 53.

Display frames split at 56 to form an upper and lower section 57 and 58, respectively, are held in channel shaped tracks 59 and 60. The said track 59 is secured to the side wall 14 by means of bracket members 61 while the track 60 is secured to the side wall 15 by means of bracket members 62. The upper section 57 of said frames are provided on each side with laterally extending pintles 63 and 64 whose function is to suspend the said frames in the channel tracks 59 and 60 and provide a pick-up means for the hooks or fingers 28 and 36 upon the chains 27 and 35. The two sections 57 and 58 of the said split frame are joined by a spring and piston device 65 consisting of a cylinder 66, a piston 67, provided with a perforation 67', a piston rod 68 and a spring 69 disposed between the piston and the head of the cylinder 66 (see Fig. 5). The cylinder 66 is pivotally attached at 70 to the lower section 58 of the said display frame and the piston rod 68 is pivotally attached at 71 to the upper section of the display frame.

To the lower edge or rim of the lower section 58 of the display frame there is attached a depending block 90 having laterally extending pins 91 and 92, two pins being mounted upon each side of said depending block. The said pins carry contact rollers 93 and 94 (see Fig. 7) and the said rollers 93 and 94 engage under tracks 95 and 96 during a part of the movement of the said display frames around the circuit. The said tracks are supported by brackets 97 and 98 extending from the side walls 14 and 15 respectively. The double pins upon each side are provided to hold the lower section of the frame in upright position while same is traveling in tracks 95 and 96.

Spacing blocks or strips 72 are attached to the lower portion of the said lower section. Stop pins 73 and 74 are provided to limit the downward movement of the arms 52 and 53 as indicated by the dotted lines in Fig. 2. To and between the top portion of the lower section 58 of the display frame as at 75, and the lower portion of the upper section of the display frame as at 76, there is attached a folding base member 77 adapted to fold downwardly at 78, and carry, attached to it above this point, an upright display card 79; to the ends of said display card 79 and the folding base member 77, there is attached inwardly folding end members 80 and 81, whose function is to keep the display card 79 in upright position. The said display frame sections 57 and 58 are formed on three sides with a channelled member or rim 82 and 83 within which plates or display cards 84 and 85 are held.

One or more electric bulbs 86 may be provided for illumination. The display in the said display frames and upon the folding member between the split sections may be marked with any form of advertising matter either pictorial or printed, and the adjacent edges of the parts that meet may be cut with any contour but both such contacting ends must be complementary to form a perfect connection when the parts come together.

To operate the device, the split display frames are set in the channelled tracks to slide to the lower end of same. When the motor is started, the chains having the fingers or hook thereon will move and the fingers will engage the pintles on the sides of the display frames when the said fingers reach the lower end of the channelled tracks. The chains moving upward will carry a display frame upwardly to the upper sprockets where the upper surface of the display frame will contact the lifting arm 55, which at this point is in the position shown by the dotted lines. Continuing its movement up and around the sprocket, the contacting upper surface of the display frame will raise the lifting arm 55 to bring the stop plates 54 and 54' out and against the lower section of the display frame to hold it back against movement while the upper section of the display frame moves on to the position shown in Fig. 2. The movement of the upper section away from the lower section of the display frame causes the piston members to expand (Figs. 2 and 5), against the spring pressure within the cylinder. As the upper section continues its movement, it passes the attached end of the lifting arm, allowing it, with the stop plates 54 and 54' to drop out of the path of the lower section, thus allowing the rollers 93 and 94 to contact and ride under the tracks 95 and 96 to hold the lower section 58, of the display frame, in its vertical position until the rollers 93 and 94 pass beyond the end of said tracks 95 and 96.

When the rollers are free of the tracks, the cylinder connection between the two sections of the display frame will act to bring the lower section to its normal position under the upper section, as indicated by the dotted lines in Fig. 5.

The pressure of the spring in the cylinder acts to bring the lower and upper sections together. The perforation in the piston prevents a too rapid movement of the piston through the cylinder during the return movement.

As the display frame moves along toward the rear sprockets, the pintles upon the frames will ride off the chains and the frame will drop, the pintles engaging in the channel slots to guide the frame down same. The spacer blocks or strips are provided to allow the passage of the fingers or hooks upon the chain and engage the pintles of the next pickup.

The action of the folding base member 77, co-acting with the end folds 80 and 81 and the split sections 57 and 58 of the split display frame will animate the upright display card 79 and bring it up to view or cause it to disappear when the split sections separate or come together, as the case may be.

I claim:

1. A display device, comprising a housing or cabinet, having a rear and side walls and a front wall formed with an observation opening, endless propelling chains mounted upon opposite side walls of said cabinet, channel members or tracks secured to opposite side walls of said cabinet, a plurality of frames carrying display cards and having pintles extending therefrom and adapted to engage in the said channeled tracks, hook members upon the chains to engage the pintles upon said frames, the said frames and display cards being sectional in formation and adapted to separate and move apart when in line with said observation opening to present a "three dimensional" aspect to the observer, means for bringing the separated parts of the display frames back to their normal position after the same have passed the said observation opening, and driving means for operating the parts.

2. The device of claim 1, wherein a means is provided for holding a section of the display frame against movement while another section is in movement.

3. The device of claim 1, including a folding base member carrying an upright display card attached to and between the upper and lower sections of the said frames and adapted, when the upper and lower sections of said frames are moved apart, to raise the said upright display card and bring it into view through the said observation opening and to lower the said display card when the two sections of said display frames are brought together.

4. The device of claim 1, wherein spacer strips are provided upon the said frames to afford a means for properly positioning same so that the said pintles thereon are held in the path of the said hook members upon the chain and are thereby picked up by the said chain.

5. The device of claim 1, wherein each section of said frames are pivotally connected upon each side to an end of a cylinder and piston having spring actuating means to normally bring and hold the said sections of the said display frames together.

MORRIS STRAUSS.